Patented Sept. 23, 1947

2,427,682

UNITED STATES PATENT OFFICE 2,427,682

PRODUCTION OF VITREOUS ENAMEL OPACIFIER

Anthony J. Lubertine, Baltimore, Md., assignor to Pemco Corporation, a corporation of Maryland No Drawing. Application October 3, 1939, Serial No. 297,767

22 Claims. (Cl. 106—48)

1

The present invention relates to the production of an opacifying material adapted to be incorporated in a vitreous or porcelain enamel.

The opacifier herein set forth is a reaction product prepared by heat treating or calcining a predetermined opacifier mixture, said mixture containing an antimony compound, a component selected from the group consisting of titanium and zirconium constituents, together with available oxygen for said antimony and titanium and/or zirconium constituents, and a metal-containing component acting as a solution retardant for the opacifier reaction product upon fusion of the vitreous enamel, in which the opacifier is incorporated; and a fluorine-containing agent or compound adapted to increase the allowable variation in the calcining temperature range and the time of heat treatment of the mixture and to also greatly increase the opacifying property of the heat treated reaction product.

The fluorine-containing material contains, in addition to the fluorine radical, a volatile radical. Stated differently, preferably a fluoride is used which will break down on calcining and furnish a fluorine component, and a volatile non-fluorine component, a very substantial proportion of the fluorine component being retained by the opacifier reaction product. The fluorine component, or at least the greater proportion thereof, will combine with the ingredients present in the reaction mixture, including the zirconium and/or titanium components, and increase the opacifying capacity of the reaction product. Examples of a fluoride having a volatile radical are ammonium fluoride and ammonium bi-fluoride. Instead of using ammonium fluoride, for the ammonium there may be substituted any volatile radical which will, when the opacifying material is calcined, break down and give off a gas, said gas during its escape having substantially no effect upon the opacifying mixture or the reaction product thereof. Instead of using an inorganic fluorine compound having a volatile radical, an organic fluorine-containing compound may be used, said organic compound containing a volatile radical.

The solution-retardant, as for example, calcium hydroxide and the volatile fluoride, such as ammonium fluoride, may be mixed in with the other constituents of the opacifier mix and then the reaction between the solution-retardant and the fluoride occurs in situ at normal atmospheric temperatures.

It may be stated that the ingredients of the opacifier mix are initially ground to pass through a one hundred mesh sieve and the calcined reaction product retains this fineness.

The following table sets forth opacifying mixtures which may be used in accordance with the present invention, said table including the preferred and broad range of materials:

| | Specific Example Having Ingredients, in percentage by weight | Broad Range of Ingredients, in percentage by weight | Preferred Range of Ingredients, in percentage by weight |
| --- | --- | --- | --- |
| $Sb_2O_3$ | 30 | 20–34 | 27–34 |
| $KNO_3$ | 9.5 | 6–14 | 8–10 |
| $NH_4F.HF$ | 9.5 | 6–16 | 8–12 |
| $TiO_2$ | 22 | 14–26 | 20–24 |
| $Ca.(OH)_2$ | 29 | 20–36 | 26–31 |

In general, it may be stated that the antimony constituent or compound may vary from about 20% by weight to 34% by weight, but preferably varies between 27% and 34% by weight, the latter percentages insuring a superior product from the standpoint of uniformity, that is, fineness and opacifying power. While the potassium nitrate, in general, may vary between 6% by weight to 14% by weight, preferably the potassium nitrate varies between 8% to 10% by weight. Since the potassium nitrate acts as an oxidizing agent to promote the necessary oxidation of the antimony trioxide and to maintain an oxidizing atmosphere during the calcining step, it is obvious that the amount of potassium nitrate present in the opacifier mixture may somewhat vary. The amount of oxidizing agent will also depend upon the state of oxidation of the antimony constituent. Instead of using potassium nitrate, other compounds may be used which will generate oxygen and function to maintain oxidizing conditions during the calcining step, it, of course, being obvious that the oxidizing agent should not deleteriously affect the properties of the opacifier reaction product. As a specific illustration, any suitable nitrate may be substituted for the potassium nitrate, as for example, an alkaline earth nitrate, including calcium nitrate, or sodium nitrate, or the like. While the nitrates are the preferred oxidizing agents, it is, of course, obvious that other prior art oxidizing agents may be substituted therefor.

It may be pointed out that the metal radical of the oxidizing agent may function as a solution retardant for the opacifier reaction product or constituents thereof.

While, in general, the fluorine compound present in the opacifier mixture may vary from about 6% by weight to 16% by weight, preferably the fluorine compound varies between 8% to 12% by weight.

While the titanium constituent, as for example, the titanium oxide, may, in general, vary between 14% by weight to 26% by weight, it preferably varies between 20% to 24% by weight. The preferred range confers superior properties upon the final opacifier reaction product from the standpoint of opacifying power and fineness of the reaction powder. It is desired to point out that the titanium oxide may be partially or wholly replaced by a zirconium compound, as for example, an oxygen-containing compound, including zirconium hydroxide. While both titanium oxides or hydroxides and the zirconium oxides or hydroxides are the preferred titanium and zirconium compounds, in the broad aspect of the invention, it is not desired to be limited to an oxygen-containing titanium compound or an oxygen-containing zirconium compound. The opacifier mixture may be such that upon the completion of the calcining step the reaction product is an oxide reaction product of antimony, titanium and/or zirconium, and a third metal, usually a divalent or a trivalent metal. The titanium and zirconium oxides or hydroxides are used because these are at the present time the cheapest available compounds of titanium and zirconium. Other compounds of these metals may be used, including the chlorides and sulfates. However, if the sulfates are to be used, all of the sulfate must be removed during the calcining operation, to prevent objectionable scumming. The chlorides may to some degree affect the set of the enamel in which the opacifier is incorporated. The important point is that the titanium, zirconium, and antimony constituents of the opacifying mixture may be any materials which will in situ form the oxygen-containing opacifier of the present invention.

It is desired to point out that the antimony compound is preferably any oxygen-containing compound and while most desirably antimony trioxide is used, the pentoxide, or even $Sb_2O_4$ may be used.

The above ingredients typified by those present is the batch previously set forth and in predetermined proportions are mixed together by milling in a ball mill, either in water suspension or as a dry powder. It is preferred to dry grind the materials, since dry grinding provides a much more rapid and economical means of mixing than wet grinding, and further dry grinding is more satisfactory from the standpoint of the uniformity of the finished product, since in the drying of the wet ground material, certain salts are dissolved in the water and a large percentage of these are deposited at the surface of the material during the drying operation. Since an oxidizing agent, preferably a nitrate is required to promote the necessary oxidation of the antimony, and since these nitrates are usually quite soluble, especially when a potassium nitrate is used, it is obvious that this will affect the uniformity of the resultant batch.

Instead of dry milling the opacifier ingredients in a ball mill, any other suitable dry grinding means may be employed. For example, the opacifier ingredients may be mixed together and finally dry ground in a micro-pulverizer, this being one type of a hammer mill. It has been discovered that the final opacifier forms a superior product if it is dry milled.

It is essential that the mix from which the opacifier reaction product is produced contain an antimony component and a titanium component, or a zirconium component, or both, together with a compound furnishing fluorine, and other compounds which will tend to stabilize and increase the opacification power of the titanium-antimony or zirconium-antimony compostiions. It is desired to point out that the additional opacifying ingredients referred to should be relatively insoluble in the molten enamel in which the calcined reaction product is incorporated. This is what is meant by the term "stability." For example, if titanium and antimony compounds per se are added to the vitreous enamel, or porcelain enamel mixtures, on fusion thereof such a large portion of the compound will be dissolved in the enamel, that under ordinary conditions, the opacification will be very slight.

While, in general, it may be stated that the calcium hydroxide solution retardant may vary between about 20% by weight to 36% by weight, preferably the calcium hydroxide solution-retardant varies between 26% to 31% by weight. If the calcium is expressed as calcium oxide then the variability is from 15% to 27% by weight and preferably from 20% to 23% by weight.

For the calcium hydroxide there may be substituted any of the prior art equivalent materials, which will function to retard the solution of the opacifier reaction product or ingredients thereof on fusion of the vitreous enamel in which the opacifier is incorporated. In general, it may be stated that compounds of the divalent and trivalent metals may be substituted in part or altogether for the calcium hydroxide as a solution retardant. As specific examples of suitable solution-retardants, mention may be made of the oxides of tin, zinc, barium, strontium, beryllium, aluminum, magnesium and the like. Any of the above metals which are relatively inert as far as opacifying capacity is concerned, may be replaced by sodium, potassium or lithium. Under some conditions oxides of the heavy metals may be used as solution retardants, as for example, copper, manganese and lead. While preferably it is desirable to introduce the inert metal into the mixture in the form of an oxide, the inert metal may be introduced in any other form, subject to the limitation that the opacifier reaction product or solid solution contain the inert solution retardant combined principally with oxygen.

By incorporating a fluorine-containing material in the opacifying mixture, facility in manufacturing is attained. For example, should opacifying mixtures such as set forth, but with no fluorine, be calcined for four hours at 2000° F. the reaction product would be over calcined and useless. If the product is calcined for only two and one-half hours, in the absence of a fluorine component, the product does not possess suitable opacifying properties. By incorporating a fluorine-containing component in the opacifying mixture variation in the time of calcining and temperature of calcining is permissible, while resulting in each case in the production of an opacifier of substantially identical properties. In other words, if the fluorine-containing material is omitted from the above opacifying material, for a given calcining time, the temperature must be rather closely controlled in order to give a suitable opacifying product, that is, one which while retaining its opacifying properties does not cause the enamel to go off-color, lose its gloss, or substantially affect any of its general properties.

If the above enamel in which no fluorine-containing component is present has its calcining range somewhat increased, keeping the period of calcining constant, then there is a tendency for the enamel to go off-color and cause the enamel to lose its gloss. On the other hand, if the fluorine-containing component is introduced into the opacifier mixture and the period of calcining maintained for a period of four hours, the temperature can be varied between about 1800° F. to 2000° F., without causing the opacifying agent to deleteriously affect the enamel to which it is added.

Further, utilizing the present invention, that is, having a fluorine-containing component present in the opacifying mix, the time of calcining may be reduced and the temperature increased to a much greater extent than when the fluorine-containing component is omitted. For example, if the time of calcining is reduced to three hours and the calcining temperature of the mass increased to about 1900° F., without the fluorine-component, the properties of the calcined reaction product would be to some extent affected. However, if the temperature were increased to about 2000° F. the resultant calcined opacifying material would tend to cause the enamel to which it is added to go off-color and lose its gloss. Over-calcining will cause the reaction product or solid solution to lose opacity, as well as gloss, and similarly if the reaction product is under-calcined the maximum opacity is not obtained. However, if a fluorine-containing component is added to the composition and the time of calcining maintained at three hours, the temperature of calcining may be increased to 2000° F. without deleteriously affecting the properties of the calcined opacifier reaction product.

The above example brings out the point that with the inclusion of a fluorine-containing component in the mass manufacturing operations are greatly facilitated, since temperature conditions do not have to be so closely controlled, and, therefore, the amount of opacifying agent which must be discarded because the latter is not up to standard, is greatly reduced.

Proceeding, in accordance with the present invention, it has been discovered that an excellent opacifier may be made by calcining opacifying mixtures of the character herein set forth, or their equivalents, for about two hours at about 1800° F.; and that the temperature of calcining may be varied from about 1600° F. to 2000° F., while varying the time of calcining from about two to about four hours without greatly affecting the character of the opacifier reaction product including its opacifying properties. In other words, the opacifier produced under the above conditions, while retaining its opacifying properties, does not cause the enamel in which it is incorporated to go off-color, lose its gloss, or have any of its properties, including its burning range, adversely affected.

It is desired to point out that the incorporation of fluorine in the opacifier reaction product greatly improves the color of the final product and insures the production of a white fluffy powder. It may be stated that if there is no fluorine present in the opacifier mix herein disclosed, that upon calcination at temperatures between 1600° F. to 2000° F. there is a tendency not only for the calcined reaction product to discolor, but for the fine particles of the reaction mix or reaction product to fuse in part or sinter together, forming a product which is composed in part of fine particles and medium sized particles, and still larger sized particles. In other words, the particle size of the opacifier reaction product is substantially uncontrolled. When the opacifier composed of particles of varying size is introduced into an enamel mix, after the enamel mix containing the opacifier has been fused, there will not be a uniform dispersion of the particles of the opacifier throughout the mix of the fused enamel and, therefore, the opacifying efficiency present in the enamel is materially decreased. On the contrary, the opacifier of the present invention, due to the presence of the fluorine, is composed of particles of uniform size, whereby the opacifying value of the opacifier is greatly increased. Proceeding as herein set forth, there is formed a white uniform powder, which is extremely fluffy.

The increase of opacity obtained by use of the fluorine compound is illustrated by the following. If a material is milled by the following formula:

Super-opaque enamel frits_____pounds__ 100
Clay _____do____ 7
Opacifier _____per cent__ 4
Magnesium carbonate _____do____ ¼ and milled to a fineness of 6 grams residue on 200 mesh sieve, the opacity will be varied by inclusion of the fluorine compound as follows:

With the inclusion of fluorine compound a 45 gram coating of the enamel will yield an opacity of 75%. With a 60 gram coating of the same formula, wherein the opacifier does not contain fluorine, an opacity of 77% was obtained.

From the above it is clear that if the fluorine be omitted from the opacifier, but the combination and method of manufacturing be held otherwise the same, a 60 gram coating is required to give the same opacity as obtained by a 45 gram coating where the fluorine bearing opacifier has been used. By opacity is meant the diffuse reflectance of the material, as measured by a standard method of measuring opacity of the Porcelain Enamel Institute. The practical significance of the above is clear in view of the fact that a 45 gram coating of enamel may be completed with a single cover coat application and firing operation; whereas a 60 gram coating requires two cover coat applications and two firings. Where the opacifier material of the present invention is used, a finished enamel piece will receive a ground coat application, then a single cover coat, and then a firing. When the opacifier of the present invention is not used, two cover coat applications are required and separate firings therebetween, all of which materially substantially increases the manufacturing cost.

The opacifier produced as herein set forth is non-deliquescent.

While it has been stated that the temperature may be varied between 1600° F. to 2000° F. and the time may vary between two to four hours, it is obvious that these figures may be somewhat departed from and still come within the spirit of the present invention. In other words, with different solution retardants, the time and temperature range during calcining will vary somewhat from those set forth. The important point is that for a given opacifying mixture, having a fairly definite calcining temperature and calcining time, these may be varied by incorporating in the mixture a fluorine-containing component of the character specified. Stated differently, the temperautre of calcining may be varied 200° F. to 300° F., above and below the usual calcining temperature of the predetermined mixture; and the time may also be varied. The time may be so varied, as for example, that material usually taking two hours to calcine at 1800° F. can be calcined at 1800° F. for three to four hours, or at 1600° F. for two to four hours, or at 2000° F. for two to four hours, provided there is incorporated in the opacifying mixture a fluorine-containing component.

The terms "calcium oxide," "alkaline earth metal oxide," and "base metal oxide" as used in the claims are intended to cover not only the oxide, but its full equivalent, the hydroxide.

What is claimed is:

1. A vitreous enamel opacifying material comprising the calcined reaction product of a mixture of 20% to 34% of an antimony oxide, an oxidizing agent in an amount to oxidize the antimony oxide and to maintain an oxidizing atmosphere during calcining, 14 to 26% of an oxide selected from the group consisting of titanium and zirconium oxides, together with the reaction product in minute particle size of an admixture of 6% to 16% of an ammonium fluoride and 20% to 36% by weight of calcium hydroxide.

2. The method of increasing the allowable variations in calcining temperature range and time of calcining treatment of a predetermined opacifying mixture, and the efficiency of the calcined reaction product upon its incorporation in a vitreous enamel, said mixture containing available oxygen together with an antimony oxide, a component selected from the group consisting of titanium and zirconium opacifying constituents appearing as oxides during the calcination period, and a supplementary base metal-oxygen-containing compound present as an oxide during the subsequent calcination and which will combine with subsequently added ammonium fluoride and increase the opacification properties of the mixture, the metal radical only of said base metal oxygen-containing compound being capable of acting as an opacifier diluent; comprising incorporating in said mixture ammonium fluoride in a quantity which will combine with said supplementary base metal oxygen-containing compound and increase the opacifying properties of the opacifying mixture, and calcining the resulting material, there being in situ formed a nascent metal fluoride of extremely minute particle size.

3. The method of increasing the allowable variations in calcining temperature range and time of calcining treatment of a predetermined opacifying mixture, and the efficiency of the calcined reaction product upon its incorporation in a vitreous enamel, said mixture containing an antimony oxide, an oxidizing agent, a constituent selected from the group of titanium and zirconium opacifying materials appearing as oxides during the calcination period, and an alkaline earth metal oxygen-containing compound present as an oxide during the subsequent calcination period and adapted to combine with subsequently added ammonium fluoride and form a compound increasing the opacifying properties of the mixture, the metal radical only of said alkaline earth metal oxygen-containing compound being capable of acting as an opacifying diluent; comprising incorporating in said mixture ammonium fluoride in a quantity which will combine with said alkaline earth metal oxygen-containing compound and increase the opacifying properties of the opacifying mixture, and calcining the resulting material, there being in situ formed a nascent alkaline earth metal fluoride of extremely minute particle size.

4. The method of increasing the allowable variations in calcining temperature range and time of calcining treatment of a predetermined opacifying mixture, and the efficiency of the calcined reaction product upon its incorporation in a vitreous enamel, said mixture containing an antimony oxide, an oxidizing agent, a titanium opacifying constituent appearing as an oxide during the calcination period, and a supplementary base metal-oxygen-containing compound present as an oxide during the subsequent calcination period and which will combine with subsequently added ammonium fluoride and form a compound increasing the opacifying properties of the mixture, the metal radical only of the supplementary base metal-oxygen-containing material being capable of acting as an opacifying diluent; comprising incorporating in said mixture ammonium fluoride in a quantity which will combine with said supplementary base metal-oxygen-containing compound and increase the opacifying properties of the opacifying mixture, and calcining the resulting material, there being in situ formed a nascent metal fluoride of extremely minute particle size.

5. The method of increasing the allowable variations in calcining temperature range and time of calcining treatment of a predetermined opacifying mixture, and the efficiency of the calcined reaction product upon its incorporation in a vitreous enamel, said mixture containing an antimony oxide, an oxidizing agent, a zirconium opacifying constituent appearing as an oxide during the calcination period, and a supplementary base metal-oxygen-containing compound present as an oxide during the subsequent calcination period and which will combine with subsequently added ammonium fluoride and form a compound increasing the opacifying properties of the mixture, the metal radical only of the supplementary base metal-oxygen-containing material being capable of acting as an opacifying diluent; comprising incorporating in said mixture ammonium fluoride in a quantity which will combine with said supplementary base metal-oxygen-containing compound and increase the opacifying properties of the opacifying mixture, and calcining the resulting material, there being in situ formed a nascent metal fluoride of extremely minute particle size.

6. The method of increasing the allowable variations in calcining temperature range and time of calcining treatment of a predetermined opacifying mixture, and the efficiency of the calcined reaction product upon its incorporation in a vitreous enamel, said mixture containing an antimony oxide and an oxidizing agent, a titanium oxide opacifying constituent, and an alkaline earth metal compound present as an oxide during the subsequent calcination period and which will combine with subsequently added ammonium fluoride and form a compound increasing the opacifying properties of the mixture, the metal radical only of the alkaline earth metal compound being capable of acting as an opacifying diluent; comprising incorporating in said mixture ammonium fluoride in a quantity which will combine with said alkaline earth metal compound and increase the opacifying properties of the opacifying mixture, and calcining the resulting material, there being a situ formed a nascent alkaline earth metal fluoride of extremely minute particle size.

7. The method of increasing the allowable variations in calcining temperature range and time of calcining treatment of a predetermined opacifying mixture, and the efficiency of the calcined reaction product upon its incorporation in a vitreous enamel, said mixture containing an antimony oxide and an oxidizing agent, a zirconium oxide opacifying constituent, and an alkaline earth metal compound present as an oxide during the subsequent calcination period and adapted to combine with subsequently added ammomium fluoride and form a compound increasing the opacifying properties of the mixture, the metal radical only of the alkaline earth metal compound being capable of acting as an opacifying diluent; comprising incorporating in said mixture ammonium fluoride in a quantity which will combine with said alkaline earth metal compound and increase the opacifying properties of the opacifying mixture, and calcining the resulting material, there being in situ formed a nascent alkaline earth metal fluoride of extremely minute particle size.

8. The method of increasing the allowable variations in calcining temperature range and time of calcining treatment of a predetermined opacifying mixture, and the efficiency of the calcined reaction product upon its incorporation in a vitreous enamel, said mixture containing available oxygen together with an antimony oxide, an opacifying constituent selected from the group consisting of titanium and zirconium oxides, and a base metal oxide adapted to combine with subsequently added ammonium fluoride and form a compound increasing the opacifying properties of the mixture; comprising incorporating in said mixture ammonium fluoride in a quantity which will combine with said base metal containing compound and increase the opacifying properties of the opacifying mixture and calcining the resulting material, there being in situ formed a nascent metal fluoride of extremely minute particle size.

9. The method of increasing the allowable variations in calcining temperature range and time of calcining treatment of a predetermined opacifying mixture, and the efficiency of the calcined reaction product upon its incorporation in a vitreous enamel, said mixture containing available oxygen together with an antimony oxide, an opacifying constituent selected from the group consisting of titanium and zirconium oxides, and calcium oxide adapted to combine with subsequently added ammonium fluoride and form a compound increasing the opacifying properties of the mixture; comprising incorporating in said mixture ammonium fluoride in a quantity which will combine with the calcium oxide and increase the opacifying properties of the opacifying mixture and calcining the resulting material, there being in situ formed nascent calcium fluoride of extremely minute particle size.

10. The method of preparing an opacifier composition for incorporation in a vitreous enamel comprising incorporating 8 to 12% of ammonium fluoride in an opacifying material containing 27 to 34% of an antimony oxide, an oxidizing material present in a quantity which will oxidize the antimony constituent and maintain oxidizing conditions during the calcining step, 20 to 24% of a component selected from the group consisting of titanium and zirconium opacifying constituents appearing during the subsequent calcining step as oxides, and an alkaline earth oxide in an amount which will combine with said ammonium fluoride; and calcining the resulting mixture, there being in situ formed a nascent alkaline earth fluoride of extremely minute particle size.

11. The method of preparing an opacifier composition for incorporation in a vitreous enamel comprising incorporating 6 to 16% of ammonium fluoride in an opacifying material containing 20 to 34% of an antimony oxide, an oxidizing material present in a quantity which will oxidize the antimony constituent and maintain oxidizing conditions during the calcining step, 14 to 26% of a component selected from the group consisting of titanium and zirconium oxides, and an alkaline earth oxide in an amount which will combine with said ammonium fluoride; and calcining the resulting mixture, there being in situ formed a nascent alkaline earth fluoride of extremely minute particle size.

12. The method of preparing an opacifier composition for incorporation in a vitreous enamel comprising incorporating 8 to 12% of ammonium fluoride in an opacifying material containing 27 to 34% of an antimony oxide, 8 to 10% of an oxidizing material, 20 to 24% of a component selected from the group consisting of titanium and zirconium oxide, and calcium oxide; and calcining the resulting mixture, there being in situ formed a nascent calcium fluoride of extremely minute particle size.

13. A vitreous enamel opacifying material comprising a calcined reaction product of a mixture of 27% to 34% of an antimony oxide, an oxidizing agent in an amount to oxidize the antimony oxide and to maintain an oxidizing atmosphere during calcining, 20% to 24% of an oxide selected from the group consisting of titanium and zirconium oxides, together with the reaction product in minute particle size of an admixture of 8% to 12% of ammonium fluoride and 26% to 31% of calcium hydroxide.

14. A vitreous enamel opacifying material comprising the calcined reaction product of a mixture of about 30% of antimony trioxide, 9.5% of potassium nitrate acting as an oxidizing agent, 22% of an oxide selected from the group consisting of titanium and zirconium, together with the reaction product in minute particle size of an admixture of about 9.5% of ammonium fluoride and about 29% calcium hydroxide, said percentages being by weight.

15. A vitreous enamel material comprising the calcined reaction mixture of an antimony oxide, an oxidizing agent, an oxide of a metal selected from the group consisting of titanium and zirconium, said constituents being present in quantities which on calcining produce a vitreous enamel material having opacifying properties, together with the reaction product in minute particle size of an admixture of ammonium fluoride and an oxygen-containing calcium compound selected from the group consisting of calcium oxide and calcium hydroxide, said ammonium fluoride being present in a quantity which will combine with said calcium compound and increase the opacifying property of the mixture.

16. The method of increasing the allowable variations in calcining temperature range and time of calcining treatment of a predetermined opacifying mixture, and the efficiency of the calcined reaction product upon its incorporation in a vitreous enamel, said mixture containing an antimony oxide, an oxidizing agent, a titanium oxide opacifying constituent, and an alkaline earth oxide compound which will combine with subsequently added ammonium fluoride and form a compound increasing the opacifying properties of the mixture, the metal radical only of the alkaline earth oxide capable of acting as an opacifying diluent; comprising incorporating in said mixture an ammonium fluoride selected from the group consisting of ammonium fluoride per se and ammonium bi-fluoride, said fluoride being present in a quantity which will combine with said alkaline earth metal oxide and increase the opacifying properties of the opacifying mixture, and calcining the resulting material, there being in situ formed a nascent alkaline earth metal fluoride of extremely minute particle size.

17. The method of increasing the allowable variations in calcining temperature range and time of calcining treatment of a predetermined opacifying mixture, and the efficiency of the calcined reaction product upon its incorporation in a vitreous enamel, said mixture containing available oxygen together with an antimony oxide, an opacifying constituent selected from the group consisting of titanium and zirconium oxides, and a base metal oxide adapted to combine with subsequently added ammonium fluoride and form a compound increasing the opacifying properties of the mixture; comprising incorporating in said mixture an ammonium fluoride selected from the group consisting of ammonium fluoride per se and ammonium bi-fluoride, said fluoride being present in a quantity which will combine with said base-metal-oxide and increase the opacifying properties of the opacifying mixture, and calcining the resulting material, there being in situ formed a nascent metal fluoride of extremely minute particle size.

18. A vitreous enamel material comprising the calcined reaction mixture of an antimony oxide, an oxidizing agent, an oxide of a metal selected from the group consisting of titanium and zirconium, said constituents being present in quantities which on calcining produce a vitreous enamel material having opacifying properties, together with the reaction product in minute particle size of an admixture of ammonium fluoride and an oxygen-containing calcium compound selected from the group consisting of calcium oxide and calcium hydroxide which will react with said fluoride, the latter being selected from the group consisting of ammonium fluoride per se and ammonium bi-fluoride, said ammonium fluoride being present in a quantity which will combine with said calcium compound and increase the opacifying properties of the mixture.

19. The method of producing an opacifying composition comprising preparing an opacifier mixture containing an antimony oxide, an oxidizing agent and a component selected from the group consisting of titanium and zirconium oxides, and in situ forming therein at a calcining temperature a calcium fluoride of extremely fine particle size by reaction between an ammonium fluoride and an oxygen-containing calcium compound selected from the group consisting of calcium oxide and calcium hydroxide.

20. The method of producing an opacifying composition comprising preparing an opacifier mixture containing an antimony oxide, an oxidizing agent and a compound selected from the group consisting of titanium and zirconium compounds appearing as oxides when subjected to a subsequent calcining step, and in situ forming therein at a calcining temperature a metal fluoride of extremely fine particle size by reaction between an ammonium fluoride and a solid metal oxide, the metal component of which is selected from the group consisting of metals in the divalent and trivalent state, said ammonium fluoride being selected from the group consisting of ammonium fluoride per se and bifluoride.

21. The method of producing an opacifying composition comprising preparing an opacifier mix containing ammonium fluoride and an oxygen-containing calcium compound selected from the group consisting of calcium oxide and calcium hydroxide and in situ forming therein at a calcining temperature, calcium fluoride of extremely fine particle size.

22. A vitreous enamel opacifying material comprising the calcined reaction product of a mixture of 20% to 34% of $Sb_2O_3$, 6% to 14% of potassium nitrate, 14% to 26% of an oxide selected from the group consisting of titanium and zirconium oxides together with the reaction product in minute particle size of an admixture of 6% to 16% of an ammonium fluoride, and 15% to 27% of calcium oxide.

ANTHONY J. LUBERTINE.

REFERENCES CITED

The following references are of record in the file of this patent:

UNITED STATES PATENTS

| Number | Name | Date |
|---|---|---|
| 2,189,148 | McIntyre et al. | Mar. 13, 1939 |
| 2,199,794 | Harshaw et al. | May 7, 1940 |
| 2,200,170 | Harshaw et al. | May 7, 1940 |

FOREIGN PATENTS

| Number | Country | Date |
|---|---|---|
| 484,562 | Great Britain | May 6, 1938 |